United States Patent [19]

Strunk

[11] Patent Number: 4,671,492
[45] Date of Patent: Jun. 9, 1987

[54] ALIGNMENT ADJUSTOR FOR MOTORS AND THE LIKE

[76] Inventor: Fred E. Strunk, Belle Isle, Cairo Bend Rd., Lebanon, Tenn. 37087

[21] Appl. No.: 830,439

[22] Filed: Feb. 18, 1986

[51] Int. Cl.$^4$ .............................................. B66F 3/08
[52] U.S. Cl. ....................................... 254/104; 29/468
[58] Field of Search ................. 29/759, 406, 464, 468; 254/104; 269/234, 285, 303, 315; 33/162

[56] References Cited

U.S. PATENT DOCUMENTS

| | | | |
|---|---|---|---|
| 1,006,974 | 10/1911 | Moore et al. | 254/104 |
| 1,612,401 | 12/1926 | Townsend | 254/104 |
| 1,637,069 | 7/1927 | Blazek | 254/104 |
| 2,147,909 | 2/1939 | Mafera | 254/104 |
| 2,170,690 | 8/1939 | Mafera | 254/104 |
| 2,732,745 | 1/1956 | Behr | 269/285 |

FOREIGN PATENT DOCUMENTS

| | | | |
|---|---|---|---|
| 80744 | 6/1983 | European Pat. Off. | 254/104 |
| 546877 | 8/1942 | United Kingdom | 33/162 |
| 569079 | 5/1945 | United Kingdom | 33/162 |

*Primary Examiner*—Percy W. Echols
*Attorney, Agent, or Firm*—Townsend and Townsend

[57] ABSTRACT

An adjustor adapted to be placed on or against a support surface and to be coupled to the mount or leg of a motor or the like for adjusting the distance, such as the vertical height of the mount from a predetermined reference. The device includes a base on which a pair of wedge members are positioned, the lower wedge member having an inclined upper surface and the upper wedge member having a lower inclined surface, the inclined surfaces being adjacent to each other. Each wedge member has a semicircular groove in the inclined surface thereof and the grooves mate with each other to form a bore for receiving a lead screw. One of the grooves has screw threads in mesh with the lead screw so that, upon rotation of the lead screw, the wedge members move relative to each other in a direction longitudinally of the lead screw. As the members move relative to each other, the upper surface of the upper member moves upwardly and downwardly as the lead screw is rotated in opposed directions. The device includes side guides on the upper wedge member which extend downwardly along the sides of the lower wedge member to prevent dirt and foreign matter from accumulating on the inclined surfaces. Also, the upper wedge member has an overhang which protects the recess containing the head of the lead screw from dirt and foreign matter accumulation.

11 Claims, 10 Drawing Figures

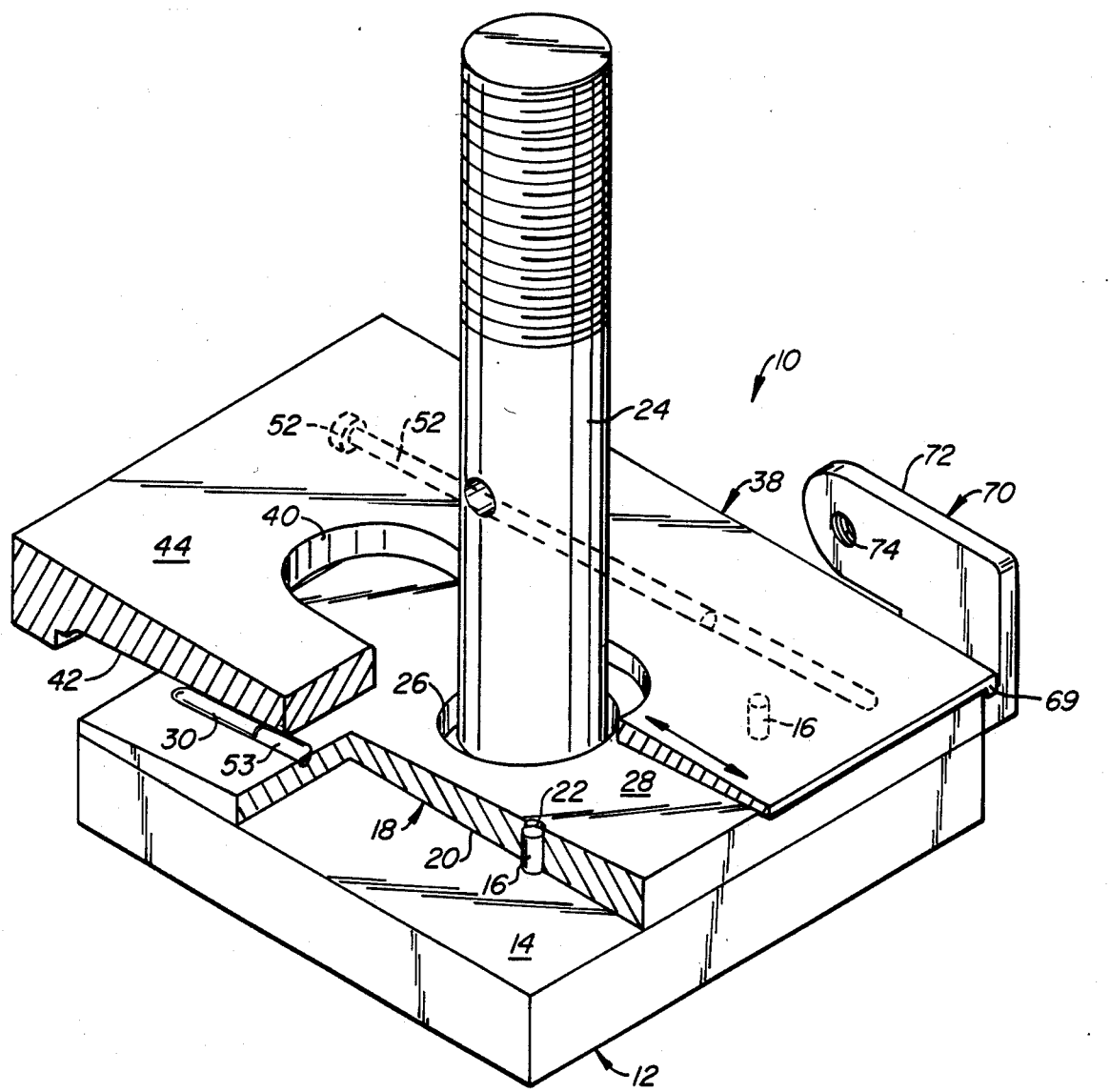
FIG._1.

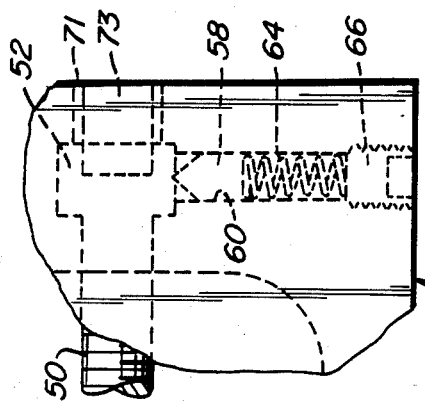
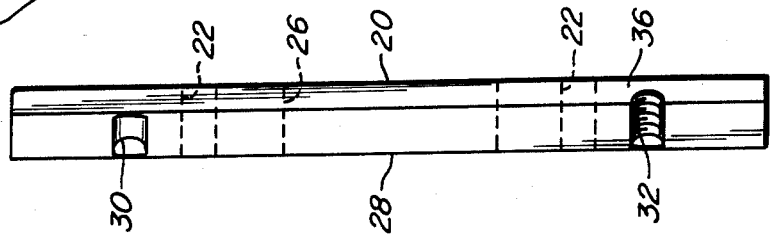
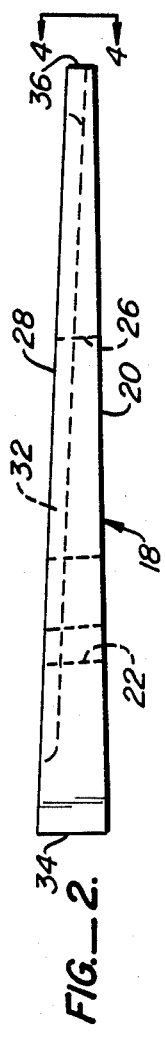
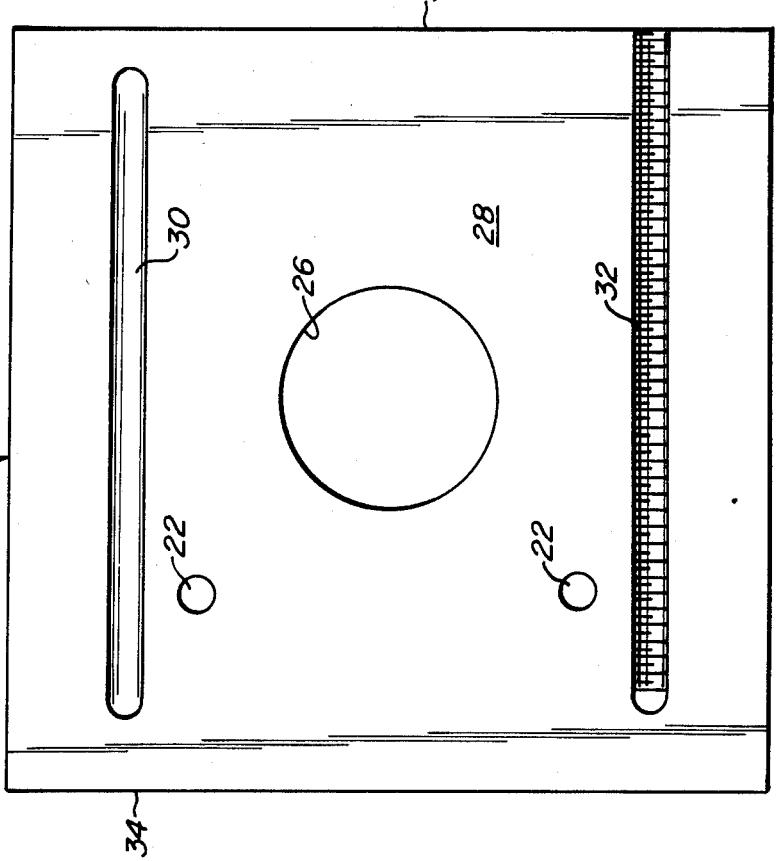

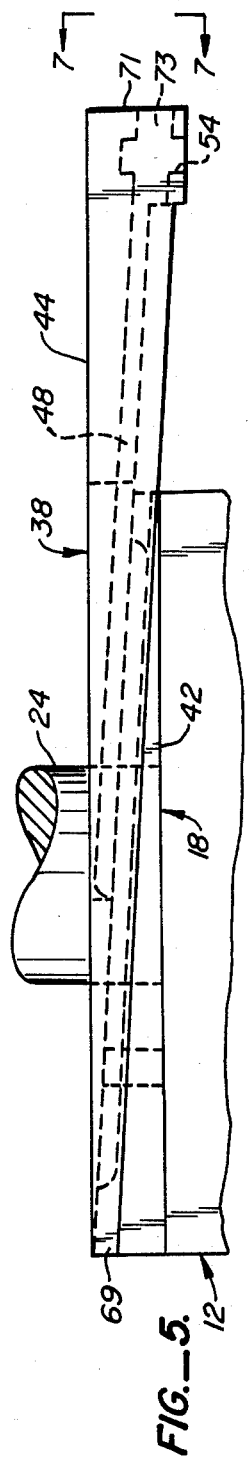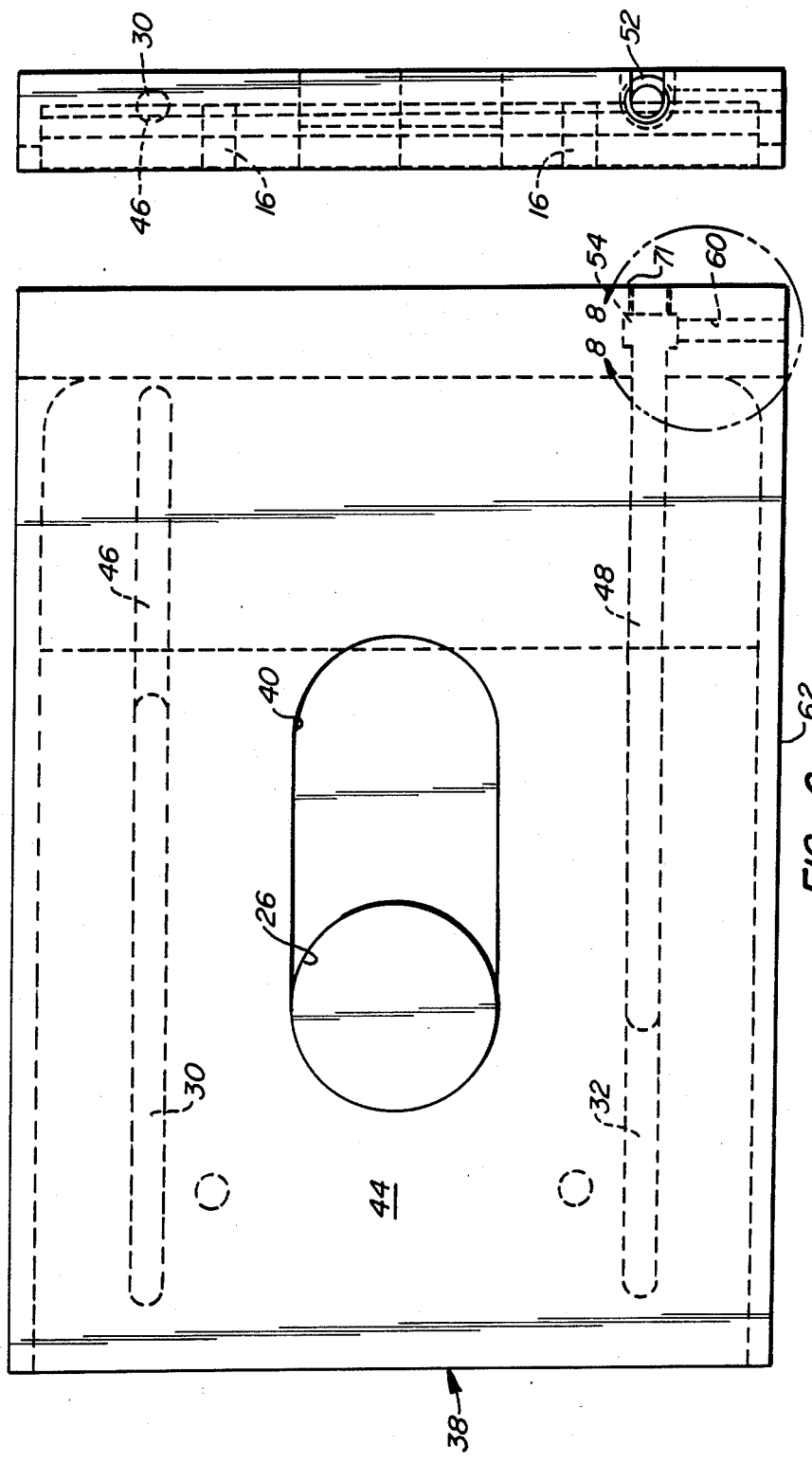

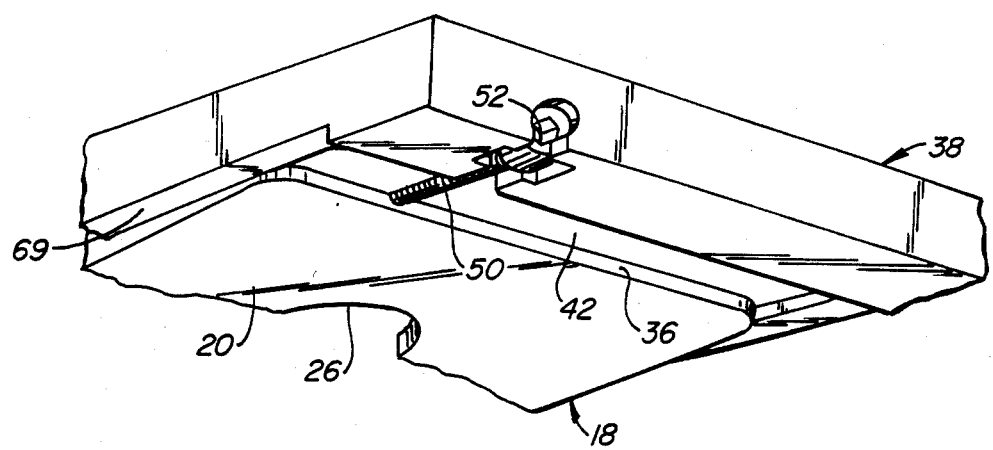
FIG._9.
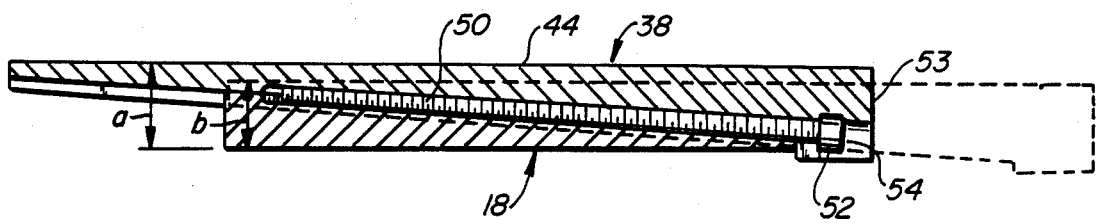
FIG._10.

ALIGNMENT ADJUSTOR FOR MOTORS AND THE LIKE

This invention relates to improvements in position adjustment devices for mechanical equipment and, more particularly, to an adjustment device for use in the alignment of a first piece of equipment with a second piece of equipment.

BACKGROUND OF THE INVENTION

Drive motors often have drive shafts which must be coupled to driven shafts for rotating the driven shafts. Unless such a drive shaft is accurately aligned with a respective driven shaft, there will be power transfer and wear problems because of the eccentricity of the two shafts. The position of the shafts must be adjusted to cause the shafts to become aligned and then coupled together.

The use of shims to adjust the height or other distance of a motor or other piece of mechanical equipment has been known for many years. Shims come in various thicknesses and they must be individually put into place on a trial and error basis until the desired height or other distance is achieved. It is a tedious process to try to find the correct shim for a particular job. Moreover, shims oftentimes wear out due to vibrations or other reasons so that they must be frequently replaced. As they wear, the shims cause misalignment of the mechanical parts which are to be held by the shims in alignment with each other.

Because of these drawbacks of conventional shims, a need has existed for an improved alignment adjustor which avoids the problems as described above. The present invention satisfies this need.

SUMMARY OF THE INVENTION

The present invention is directed to an alignment adjustor for use with a motor or the like wherein the adjustor has a pair of wedge shaped members having inclined or angled surfaces in face-to-face relationship to each other. The inclined surfaces have semicircular grooves which mate with each other to form a single bore. One of the grooves has screw threads, and a lead screw in the bore formed by the mating grooves is coupled with the screw threads of the one groove. As the lead screw is rotated in one sense, one of the wedge members moves relative to the other wedge member in a straight line in one direction. Conversely, as the lead screw is rotated in the opposite sense, the one wedge member moves in a straight line in the opposite direction relative to the other wedge member.

The wedge members are coupled in some suitable manner to a motor mount or other piece of equipment to be adjusted in height or other distance. In a preferred embodiment, the wedge members are mounted on a base having pin means inserted into holes in the wedge member next adjacent to the base to prevent lateral movement of the wedge members relative to the base. A shaft extends outwardly from the base through a first generally circular hole in the adjacent wedge member and through an elongated hole in the other wedge member, whereby a motor mount or other piece of equipment can be secured to the shaft and thereby to the base while the motor mount or other equipment piece is in slidable engagement with the outer surface of the other wedge member. Thus, by rotating the lead screw, the other wedge member can be moved relative to and along the wedge member adjacent to the base to thereby increase or decrease the height or distance of the motor mount from the base or other fixed reference.

The primary object of the present invention is to provide an improved alignment adjustor for use with motors or the like wherein the adjustor has a pair of relatively shiftable wedge-shaped members and a lead screw between the members for shifting one of the wedge members relative to the other member to thereby provide for adjustments in the height or other distance of a motor or other piece of equipment with respect to a fixed reference, such as the axis of rotation of a shaft on a second piece of equipment.

Another object of the present invention is to provide an adjustor of the type described wherein the adjustor incorporates the compound use of two inclined planes, one being formed by the inclined surfaces of the wedge members and the other being formed by a lead screw which is used to move the wedge members relative to each other, both of such inclined planes work together to accomplish minute vertical adjustments of a motor or other piece of equipment.

Other objects of this invention will become apparent as the following specification progresses, reference being had to the accompanying drawings for an illustration of the invention.

IN THE DRAWINGS

FIG. 1 is a perspective view, partly broken away and in section of the alignment adjustor of the present invention;

FIG. 2 is a side elevational view of a lower wedge member forming a part of the adjustor of FIG. 1;

FIG. 3 is a top plan view of the lower wedge member of FIG. 2;

FIG. 4 is an end elevational view of the lower wedge member of FIGS. 2 and 3 taken along line 4—4 of FIG. 2;

FIG. 5 is a side elevational view of the lower wedge member in combination with an upper wedge member;

FIG. 6 is a top plan view of the combination of the upper and the lower wedge members as shown in FIG. 5;

FIG. 7 is an end elevational view of the upper wedge member when viewed in the direction of line 7—7 of Fig. 5;

FIG. 8 is an enlarged, fragmentary top plan view of the upper wedge member taken along line 8—8 of FIG. 6;

FIG. 9 is a fragmentary, perspective view looking at the bottom surfaces of the upper and lower wedge members; and FIG. 10 is a cross sectional view of the upper and lower wedge members when the same are coupled to the lead screw.

The alignment adjustor of the present invention is broadly denoted by the numeral 10 and includes a base 12 adapted to be placed on a support surface, such as a floor or the like. The adjustor 10 is adapted for a number of different uses but is especially adapted for alignment of a motor or first piece of equipment with a second piece of equipment. For instance, adjustor 10 is especially adapted for use where the drive shaft of a motor must be accurately aligned with a driven shaft of a work-producing unit, such as a fluid pump. With the adjustor as hereinafter described, it is possible to accomplish minute vertical or other adjustments quickly and easily so as to avoid the need for conventional shims.

Once an adjustment has been made with adjustor 10, it need not thereafter be further re-adjusted for long periods of time. Also, adjustment can be readily checked from time to time as deemed necessary. Also, adjustor 10 needs no replacement as is required with conventional shims which wear out periodically.

Base 12 has a flat surface 14 which has a pair of pins 16 extending outwardly therefrom. Base 12 will typically be mounted on a horizontal surface. While it can be mounted on any surface, horizontal, angled or vertical, it will hereafter be described as being mounted on a horizontal surface.

The base 12 is adapted to support a first or lower wedge member 18 thereon, member 18 having a generally flat lower surface 20 which is in surface-to-surface contact with upper surface 14 of base 12. Member 18 has a pair of holes 22 which receive pins 16 so that, while member 18 is removably mounted on base 12, the pins render the lower member 18 fixed with respect to movement laterally of base 12.

The base has a shaft 24 extending outwardly therefrom. Lower member 18 has a center hole 26 through which shaft 24 passes when the lower member 18 is on base 12 as shown in FIG. 1. The upper end of shaft 24 is threaded to receive a nut such that, when the shaft extends through a hole in a leg or mount of a motor or other piece of equipment to be aligned, a nut can be threaded onto shaft 24 to releasably couple the mount or leg to adjustor 10.

As shown in FIG. 2, lower member 18 has an upper surface 28 which is inclined with respect to lower surface 20. For purposes of illustration, the upper inclined surface 28 of member 18 rises at the rate of 0.096 inch for every 1.5 inch horizontal distance measurement.

As shown in FIGS. 2 and 3, the upper surface 28 of lower member 18 is substantially flat. A pair of semicircular, parallel grooves 30 and 32 are formed in surface 28. The ends of groove 30 terminate short of the end faces 34 and 36 of lower member 18; whereas, one end of groove 32 is short of end face 34 while the other end of groove 32 terminates at end face 36. Groove 32 is provided with partial screw threads as shown in FIG. 3 for threadably coupling lower member 18 with a lead screw as hereinafter described.

An upper wedge member 38 is movably placed over the upper surface 28 of lower member 18 for movement relative thereto longitudinally of grooves 30 and 32. Upper member 38 has an elongated, oval-shaped central opening 40 which receives shaft 24 and allows upper member 38 to move relative to lower member 18 and base 12 longitudinally of grooves 30 and 32.

The lower surface 42 (FIG. 1) of upper member 38 is inclined with respect to the generally flat upper face 44 of upper member 38. Lower surface 42 of upper member 38 is in generally face-to-face, sliding relationship to the inclined upper surface 28 of lower member 18. Thus, inclined surfaces 28 and 42 define an inclined plane over which upper wedge member 38 moves.

Upper member 38 has a pair of elongated semicircular, parallel grooves denoted by the numerals 46 and 48 (FIG. 6). Groove 46 generally overlies groove 30 to form a first bore, and groove 48 overlies groove 32 to form a second bore parallel to the first bore. A cylindrical roller 51 (FIG. 1) is slidably and rotatably received within the first bore defined by aligned grooves 30 and 46 to facilitate the movement of upper member 38 relative to lower member 18. Roller 51 also serves to limit the travel of upper member 38 longitudinally of grooves 30 and 32.

A lead screw 50 is rotatably received within the bore defined by aligned grooves 32 and 48. The lead screw is in threadably coupled relationship to the threads in groove 32. The lead screw has a head 52 which is rotatably received within an enlarged recess 54 (FIGS. 5, 6 and 8) near one end face 53 of upper wedge member 38 and the lead screw, when rotated in a first sense, causes movement of upper member 38 in one direction relative to lower member 18. Rotation of the lead screw in the opposite sense causes reversal of the movement of the upper member 38 relative to lower member 18.

A lock may be provided to releasably secure the lead screw in a fixed position relative to member 38. This lock includes a bearing element 58 (FIG. 8) which ajustably bears against the head 52 of lead screw 50. Bearing element 58 is within a side bore 60 which extends inwardly from the side face 62 (FIG. 6) of upper member 38, the bore 60 communicating with the recess 54 for receiving head 52. A coil spring 64 in bore 60 bears against bearing element 58 and is adjustable in place by virtue of a set screw 66 threadably mounted in bore 60 near the outer end thereof.

Adjustor 10 has means for preventing dust or other foreign material from reaching inclined surfaces 28 and 42 of lower and upper members 18 and 38, respectively. To this end, the sides of upper member 38 are provides with side flanges 69 (FIGS. 1 and 5) which extend downwardly along and next to the corresponding side faces of lower member 18. Flanges 69 prevent dirt or dust from moving past the interface between flanges 69 and the sides of lower member 18.

As shown in FIG. 5, recess 54 for the head 52 of the lead screw is provided with a circular flange 71 which retains the head 52 of the lead screw in recess 54. The segment 71 surrounds a central opening 73 which allows a tool, such as a wrench or a screwdriver into recess 54 for coupled relationship to the head of the screw.

Incorporated into the design of adjustor 10 but separate from the vertical adjustment feature thereof is a threaded horizontal position adjustor denoted by the numeral 70 and shown in FIG. 1 as being rigidly secured to one side face of lower member 18 as shown in FIG. 1. Adjustor 70 includes a plate-like element 72 having a hole 74 therethrough, the hole being internally threaded for receiving a threaded bolt or the like coupled in some suitable manner to a fixed reference whereby, when the bolt is rotated, adjustor 70 causes lower member 18 and thereby adjustor 10 to move horizontally along the support surface on which base 12 is mounted. Thus, adjustor 70 allows horizontal adjustment of motors and the like in small increments.

In operation, adjustor 10 is mounted at the base of a piece of equipment, such as a motor mount. The motor mount typically has a hole for receiving the shaft 24. The mount will be shiftably mounted on the upper surface 44 of upper member 38 so that, when the mount is fixedly coupled to shaft 24, member 38 can shift relative to shaft 24 and the mount to thereby raise or lower the mount depending upon the direction of movement of the upper member 38. Typically, the upper surface 44 of upper member 38 will be generally horizontal as shown in FIGS. 5 and 7.

Assuming upper member 38 is in the full line position with respect to the lower member 18 as shown in FIG. 10, rotation of the screw 50 in a counterclockwise sense when viewing FIG. 9 will cause the screw and the upper member 38 to move to the right when viewing FIG. 10 from the full line position eventually into the dashed line position thereof. When this occurs, the height changes from a value a to a value b so that the displacement vertically is the difference between a and b. By rotating the screw in the opposite sense, member 38 will be moved to the left when viewing FIG. 10 relative to lower member 18.

Screw 50 moves with upper member 38 regardless of which direction the member moves because the screw is in mesh with the threads in groove 32 of lower member 18. As the upper member 38 moves relative to lower member 18, roller 51 minimizes friction between the upper surface 28 of lower member 18 and lower surface 42 of upper member 38. Once the height of upper member 38 has been adjusted, the lead screw 50 is locked in place by moving screw 66 upwardly when viewing FIG. 8 to increase the bias force of spring 54 exerted on bearing element 58 to effectively lock head 52 against rotation relative to upper member 38.

The present invention provides an alignment adjustor which incorporates compound use of two inclined planes, one being the wedge defined by inclined surfaces 28 and 42, and the other being defined by the lead screw 50. The inclined planes and screw work together to accomplish minute adjustments quickly and easily. The vertical rise of the upper member 38 is regulated by the combined calculated ratios between the number of threads of the leads screw per inch and the percentage of rise per inch of the inclined plane defined by surfaces 28 and 42. All working surfaces are covered to protect the same from dirt and moisture. The floating pin 51 limits the travel of the two plane surfaces 28 and 42 to that necessary for a vertical adjustment while preventing the two plane surfaces from separating from each other.

I claim:

1. An alignment adjustor for a mount of a motor or the like comprising:
   a pair of relatively shiftable wedge-shaped members, each member having an inclined surface, the inclined surfaces being contiguous to each other, one of the members being couplable with said mount when the other member is between the mount and the one member; and
   means between the members and adjacent to said inclined faces for moving the other member relative to said one member to thereby change the distance of the mount from a predetermined reference;
   said moving means includes a lead screw, each of said members having a groove in the inclined surface thereof, the grooves being in mating relationship to form a bore, only the groove of the one member being provided with screw threads, said lead screw being in the bore and rotatable relative to the members.

2. An alignment adjustor as set forth in claim 1, wherein is included a base and a shaft, said one member being mounted on the base, said shaft being secured to and extending outwardly from the base and through said members.

3. An alignment adjustor as set forth in claim 2, wherein the base has a pair of spaced pins, said one member having a pair of bores for receiving the pins to prevent lateral movement of the one member relative to the base.

4. An alignment adjustor as set forth in claim 1, wherein the lead screw has a head, said other member having a recess near one end thereof, the recess communicating with the groove in the other member, said recess defining a space for rotatably receiving the head of the lead screw.

5. An alignment adjustor as set forth in claim 4, wherein said other member has an overhang adjacent to the recess to prevent the entrance of foreign material into the groove of the members.

6. An alignment adjustor as set forth in claim 5, wherein is included means for releasably locking the lead screw against rotation relative to the members.

7. An alignment adjustor as set forth in claim 6, wherein said other member has a side bore therein communicating with the recess, there being a bearing element in said side bore for engaging the head of the lead screw when the head is in said recess, and means for urging the bearing element into engagement with the head of the lead screw.

8. An alignment adjustor as set forth in claim 7, wherein said urging means includes a coil spring in the bore and a screw bearing against the coil spring to compress the latter to force the bearing element against the head of the lead screw.

9. An alignment adjustor as set forth in claim 1, wherein said other member is above the one member and has a pair of side flanges extending along respective sides of the one member to prevent the entrance of foreign matter into the region near the inclined surfaces.

10. An alignment adjustor as set forth in claim 1, wherein said members have respective second grooves therein, the second grooves mating with each other to form a bore, there being a cylindrical roller in the second bore to facilitate the movement of the members relative to each other.

11. An alignment adjustor as set forth in claim 1, wherein is included a bar secured to the side of one of the members and provided with an internally threaded bore therethrough, said bar being usable as a horizontal position adjustor for allowing horizontal adjustment of motor mounts of motors or the like.

* * * * *